United States Patent [19]
Fleeman et al.

[11] Patent Number: 5,738,723
[45] Date of Patent: Apr. 14, 1998

[54] SYSTEM FOR FORMING METAL TUBING

[75] Inventors: Larry Fleeman, Ann Arbor; Charles E. Emmons, Brooklyn, both of Mich.

[73] Assignee: Pilot Industries, Inc., Dexter, Mich.

[21] Appl. No.: 563,492

[22] Filed: Nov. 28, 1995

[51] Int. Cl.$^6$ .................. B23K 1/00; B05C 3/12; C23C 2/02

[52] U.S. Cl. .............. 118/67; 118/419; 118/DIG. 11; 118/DIG. 12; 228/17.5; 228/42

[58] Field of Search .............. 427/230, 433, 427/434.6; 118/DIG. 11, DIG. 12, 67, 68, 69, 72, 419, 423; 228/199, 200, 143, 149, 156, 219, 17.5, 17.7, 46.42; 72/258, 268

[56] References Cited

U.S. PATENT DOCUMENTS

| | | | |
|---|---|---|---|
| 376,681 | 1/1888 | Root | 228/145 |
| 1,739,757 | 12/1929 | Hand | 228/145 |
| 1,841,300 | 1/1932 | Scarritt | 138/154 |
| 1,892,607 | 12/1932 | Bundy | 228/143 |
| 1,930,191 | 10/1933 | Bundy | 29/182 |
| 1,949,623 | 3/1934 | Quarnstrom | 148/31 |
| 2,092,557 | 9/1937 | Quarnstrom | 113/112 |
| 2,316,349 | 4/1943 | McMinn | 138/73 |
| 2,539,247 | 1/1951 | Hensel | 29/189 |
| 2,748,067 | 5/1956 | Pease, III et al. | 204/37 |
| 2,779,999 | 2/1957 | Boam et al. | 29/498 |
| 2,878,172 | 3/1959 | Scavullo | 204/40 |
| 2,942,999 | 6/1960 | Roehl et al. | 117/50 |
| 3,076,260 | 2/1963 | Roehl | 29/476.5 |
| 3,095,973 | 7/1963 | Buigne | 72/261 |
| 3,137,389 | 6/1964 | Buigne | 72/268 |
| 3,491,721 | 1/1970 | Gill et al. | 118/622 |
| 3,658,490 | 4/1972 | Kubo | 29/196.6 |
| 3,661,624 | 5/1972 | Versoy et al. | 117/94 |
| 3,877,975 | 4/1975 | Raymond | 427/345 |
| 3,908,593 | 9/1975 | Rossi et al. | 116/620 |
| 5,000,369 | 3/1991 | Shotts et al. | 228/147 |
| 5,453,302 | 9/1995 | Chaudhry et al. | 427/430.1 |
| 5,474,227 | 12/1995 | Krengel et al. | 228/147 |

OTHER PUBLICATIONS

"Copper-Brazed Steel Tube Analysis," Dr. Y.J. Lee, et al., Steel Rolling Institute, Jul. 1983.

*Primary Examiner*—Bruce F. Bell
*Assistant Examiner*—William T. Leader
*Attorney, Agent, or Firm*—Gifford, Krass, Groh, Sprinkle, Patmore, Anderson & Citkowski, P.C.

[57] ABSTRACT

A system is disclosed for forming metal tubing and, more particularly, brake tubing. The system includes a mill for rolling a metal strip into a tube so that at least a portion of the strip overlaps itself. The strip is then brazed so that the overlapping portions of the strip fuse together and form the tube. Thereafter, the tube passes through a cooling tunnel which cools the tube to a temperature such that the tube can be coated with a corrosion resistant material, such as a zinc based material. An inert gas, such as argon, and/or a reducing gas, such as hydrogen, is introduced into the cooling tunnel to prevent or remove oxidation of the tubing as it passes through the cooling tunnel.

15 Claims, 2 Drawing Sheets

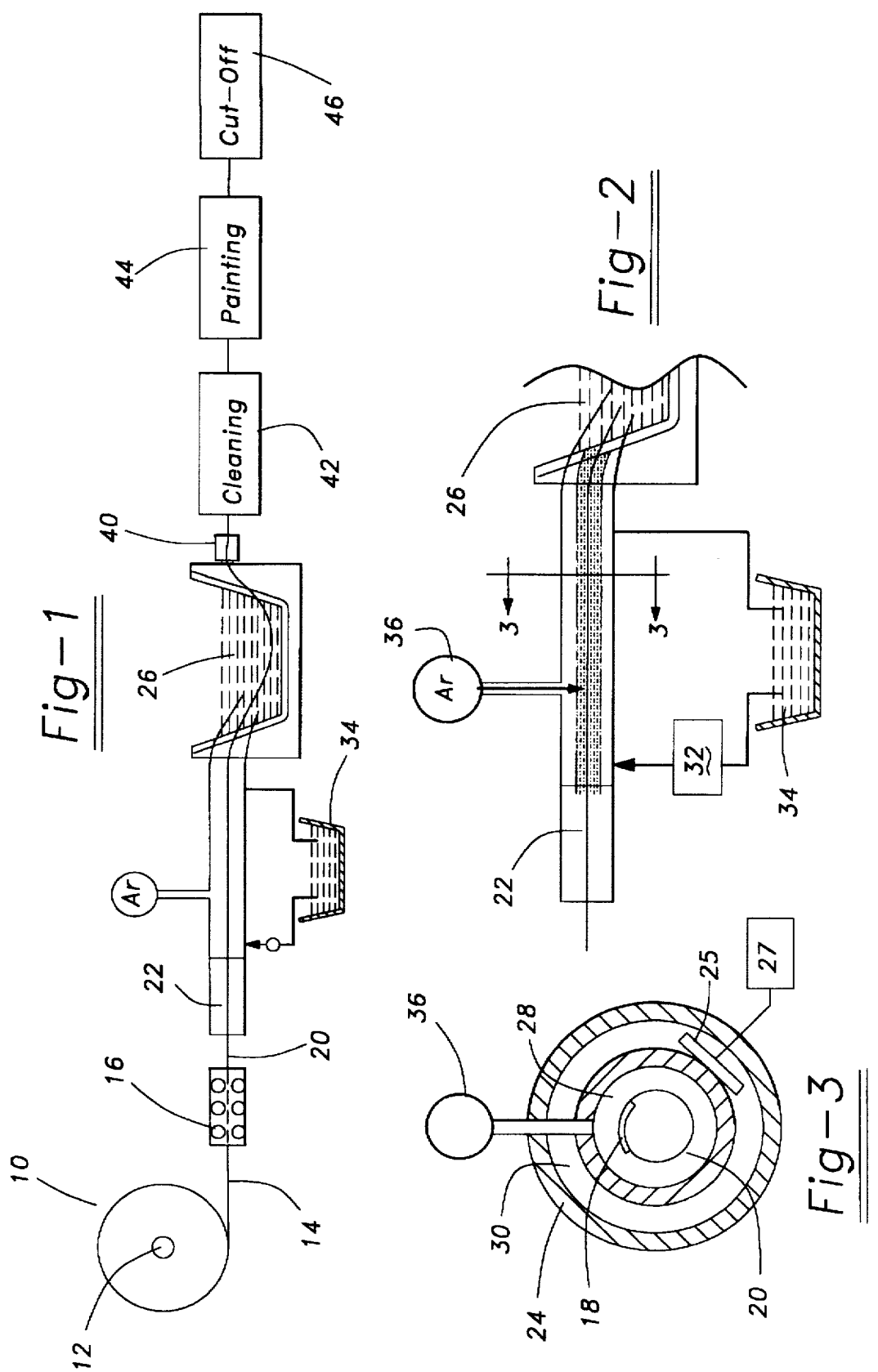

SYSTEM FOR FORMING METAL TUBING

BACKGROUND OF THE INVENTION

I. Field of the Invention

The present invention relates generally to a system for forming metal tubing and, more particularly, to a system forming a metal tubing, such as brake tubing, which is coated with a corrosion resistant material.

II. Description of the Prior Art

Metal tubing of the type used for brake lines in automotive vehicles is conventionally made from copper clad steel tubing which is then coated with a material to prevent corrosion of the tubing. The corrosion resistant material is typically a zinc alloy.

In order to form the tube, a flat metal strip of copper-clad steel is rolled by a mill to form the tubing so that at least a portion of the strip overlaps itself. The tube is then brazed to bond the overlapping portions of the strip together and the strip is then cooled. During brazing, the tube is treated to remove any oxidation which may have formed on the tube and, thereafter, the tube is coated with the corrosion resistant material.

This previously known system for forming brake tubing, however, suffered from several disadvantages. One disadvantage is the necessity to treat the tube after the tube has been brazed and prior to its coating with corrosion resistant material to remove any oxidation which may have formed on the tube.

A still further disadvantage of these previously known systems is that soot frequently forms within the interior of the tube during the brazing step. This soot is believed to result from the incineration of greases, oils or other contaminants on the metal strip when it is brazed. Such soot may adversely affect the braking system in which the brake robe is ultimately installed.

A still further disadvantage of these previously known brake tube forming systems is that the corrosion resistant material, i.e. the zinc alloy, is conventionally maintained within a reservoir which is maintained at an elevated temperature, typically 850°–1400° F. Such reservoirs are not only space consuming, but also consume substantial energy since the reservoir must maintain the zinc alloy in a liquid state at all times.

SUMMARY OF THE PRESENT INVENTION

The present invention provides a system for forming metal tubing from a metal strip which overcomes all of the above-mentioned disadvantages of the previously known devices.

In brief, the system of the present invention comprises means for rolling a metal strip, typically copper-clad steel, into a tube so that at least a portion of the strip overlaps each other. The tube is then passed through a brazing station which brazes or welds the overlapping portions of the strip together to complete the formation of the tube. Alternatively, however, the tube may be preformed or formed by butting edges of the strip together and then welding.

After the brazing station, the tube passes through an interior of a cooling tunnel surrounded by a water jacket. The temperature of the water in the water jacket is substantially cooler than the temperature of the tube, thus rapidly cooling the tube from its brazing temperature, approximately 2000°–2250° F., to 850°–1400° F. Cooled idler rollers may also be used to contact, guide and cool the tube after brazing. The cooling of the tube is done in preparation for coating the tube with a corrosion resistant material, typically a zinc based alloy.

In order to remove and/or prevent oxidation from forming on the tube as it passes through the cooling tunnel, an inert gas, such as argon, and/or a reducing gas, such as hydrogen, is introduced into the interior of the cooling tunnel and thus around the tube. The inert and/or reducing gases effectively prevent oxidation from forming on the tube, and removes any oxidation which may have formed on the tube.

In one embodiment of the invention, the tube is guided through a reservoir filled with the molten, corrosion resistant material in order to coat the tube. In a second preferred embodiment of the invention, the tube passes through a die opening which is slightly greater in diameter than the diameter of the tube. The corrosion resistant material is then fed while in a solid, but plastic state into the space formed between the tube and the die opening in order to coat the tube with the corrosion resistant material.

After the tube has been coated with the corrosion resistant material, the tube is optionally passivated, painted and cut off.

BRIEF DESCRIPTION OF THE DRAWING

A better understanding of the present invention will be had upon reference to the following detailed description, when read in conjunction with the accompanying drawing wherein like referenced characters refer to like parts throughout the several views, and in which:

FIG. 1 is a diagrammatic view illustrating a preferred embodiment of the system of the present invention;

FIG. 2 is a diagrammatic view illustrating a portion of the preferred embodiment of the preferred invention;

FIG. 3 is a view taken substantially along lines 3—3 in FIG. 2 and enlarged for clarity;

DETAILED DESCRIPTION OF A PREFERRED EMBODIMENT OF THE PRESENT INVENTION

Figure 4:
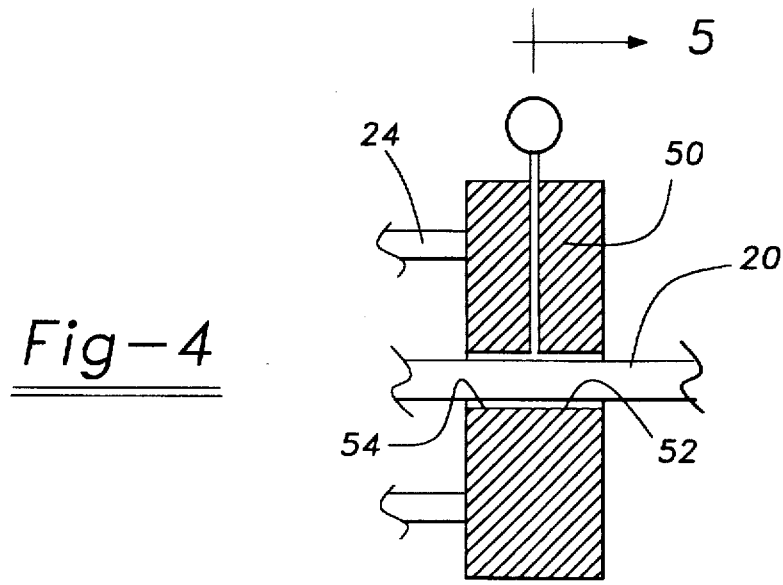
FIG. 4 is a side diagrammatic view illustrating a portion of a second preferred embodiment of the present invention.

With reference first to FIG. 1, a preferred embodiment of the system for forming the tube of the present invention is there shown and comprises a roll 10 of a flat metal strip 14, such as copper-clad steel. The roll 10 is mounted on an axle 12 so that the strip 14 of metal may be continuously unwound from the roll 10.

With reference now to FIGS. 1 and 3, the metal strip 14 passes through a rolling mill 16 (FIG. 1) which rolls the strip 14 so that portions 18 (FIG. 3) overlap each other to form a tube 20. The mill 16 is conventional in construction so that a further description thereof is unnecessary.

With reference now to FIGS. 1 and 2, the tube 20 formed by the mill 16 then passes through a brazing station 22 which heats the tube 20 above the melting temperature of copper, but below that of steel such that the overlapping portions 18 of the strip 14 fuse together thus completing the formation of the tube 20. Preferably, the brazing station 22 comprises an induction heater which heats the tube to its brazing temperature, approximately 2000°–2250° F. Optionally, however, other types of heaters than induction heaters can be used to heat the tube 20 to its brazing temperature.

Although the tube 20 is preferably rolled and brazed, any type of tube construction may be used. For example, the tube may be preformed or butt welded, i.e. the ends of strip 14 are butted together and then welded.

With reference now to FIGS. 2 and 3, the system of the present invention further comprises an elongated cooling tunnel 24 which extends the entire distance between the brazing station 22, or heating station for other types of tubes, and a reservoir 26 filled with a corrosion resistant material, such as a zinc alloy. As best shown in FIG. 3, the cooling tunnel 24 includes an interior 28 through which the tube 20 passes between the brazing station 22 and the reservoir 26 as well as a chamber 30 which coaxially surrounds the tunnel interior 28.

As best shown in FIG. 2, a pump 32 continuously pumps water from a water reservoir 34 through the chamber 30 such that the chamber 30 forms a cooling water jacket. Furthermore, the temperature of the water in the reservoir 34 is substantially lower than the temperature of the tubing so that the cooling tunnel 24 rapidly cools the tube 20 from its brazing temperature, approximately 2000°–2250° F., to a temperature between 850°–1400° F., and more preferably to the same temperature as the reservoir 26. Such cooling of the tube 20 is necessary in order to enable the corrosion resistant material in the reservoir 26 to adhere to the outer surface of the tube 20, without forming brittle or undesirable compounds.

Referring now to FIG. 3, it may be necessary to cool the tube 20 more rapidly than can be accomplished by heat transfer to the gas and/or limited contact between the tube 20 and the interior walls of the tunnel 24. In this case, cooled idler rollers 25 may be positioned in the tunnel 24 which contact, guide and cool the tube 20 as required. The idler rollers 25 may be cooled by any conventional cooling means 27.

Still referring to FIGS. 2 and 3, in order to prevent oxidation of the tube between the brazing station 22 and the reservoir 26, as well as remove any oxidation that may be present on the tube 20, an inert gas, such as argon, and/or a reducing gas, such as hydrogen, is introduced from a source 36 into the interior 28 of the tunnel 24 so that the inert and/or reducing gas 36 surrounds the tube 20 and prevents or removes oxidation on the outer periphery of the tube 20. A mix of five percent hydrogen and the balance argon or helium is the preferred gas mixture.

The reservoir 26 forms a barrier to the inert and/or reducing gas within the interior 28 of the cooling tunnel 24 such that the inert and/or reducing gas exhausts from the cooling tunnel out through the brazing station 22. Furthermore, it has been found that some of the inert and/or reducing gas enters into the interior of the tube before it is brazed together and effectively prevents, or at least minimizes, the formation of soot within the interior of the tube.

With reference now again to FIG. 1, after the tube 20 passes through the reservoir 26, the tube passes through a wiper assembly 40 which wipes excess material from the reservoir 26 from the tube 20 and returns the excess material to the reservoir 26. Thereafter, the tube 20 optionally passes through a chemical passivation station 42, a painting station 44 and a cut-off station 46.

Figure 5:
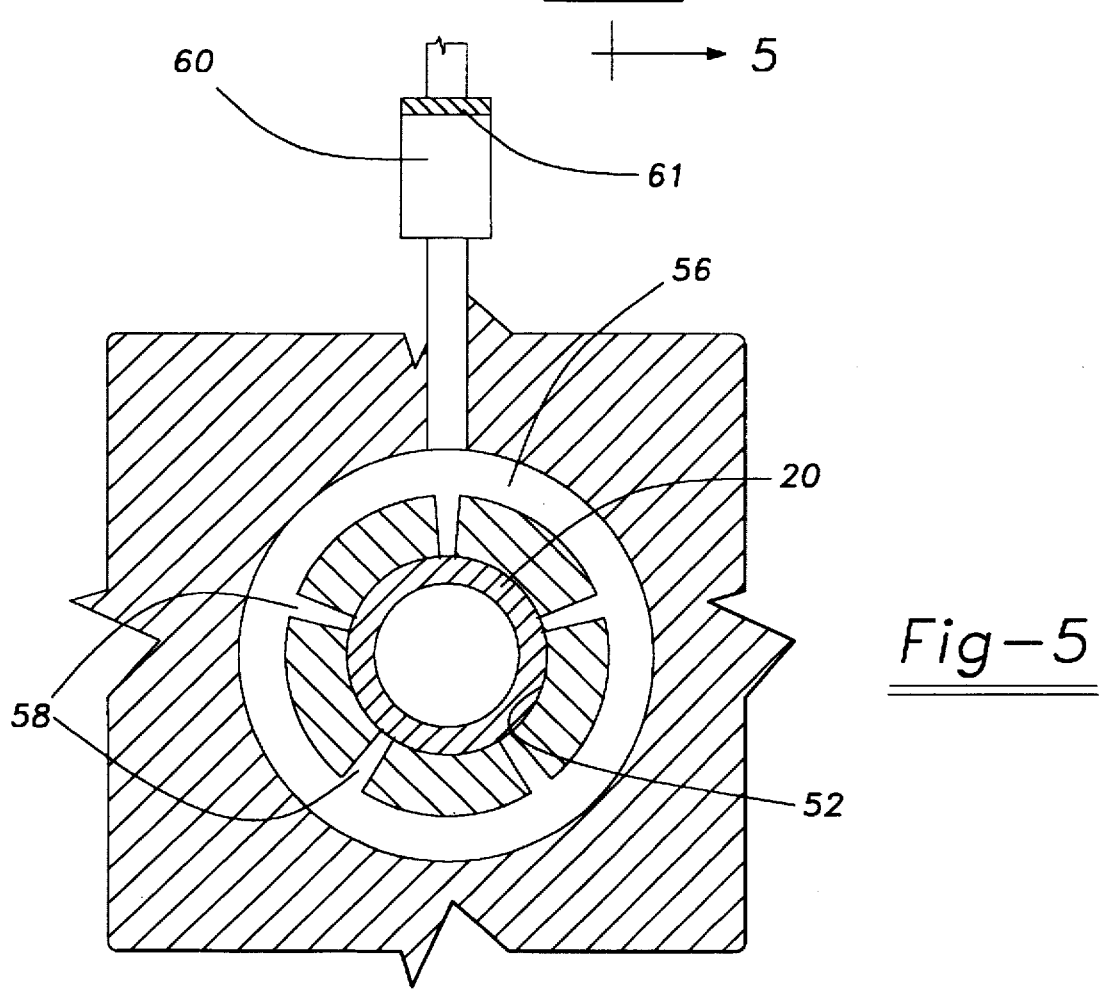
FIG. 5 is a view taken substantially along the line 5—5 in FIG. 4.

With reference now to FIGS. 4 and 5, an alternative embodiment of the present invention is thereshown in which a die 50 replaces the reservoir 26 of corrosion resistant material. The die 50 includes an opening 52 slightly larger than the outside diameter of the tube 20 so that a space 54 (exaggerated in FIG. 4) is formed between the tube 20 and the die opening 52.

As best shown in FIG. 5, a chamber 56 coaxially surrounds the die opening 52 while circumferentially spaced in regularly extending passages 58 extend between the chamber 56 and opening 52. A source 60 of corrosion resistant material in a solid, but plastic state is fed into the chamber 56 under high pressure by a hydraulic ram 61 so that the material passes through the passageways 58 and into the space 54 to thereby coat the tube 20 with a corrosion resistant material. As before, the cooling tunnel 24 (FIG. 4) extends up to the die 50 to prevent oxidation of the tube 20.

From the foregoing, it can be seen that the present invention provides a novel system for forming brake tubing which is coated with a corrosion resistant material. Unlike the previously known systems, there is no need to remove oxidation from the tube prior to its coating with the corrosion resistant material since the inert and/or reducing gas from the source 36 effectively prevents or removes oxidation of the tube while the tube is brazed. Furthermore, the simple die arrangement in the alternate embodiment of the present invention eliminates the previously known necessity of the reservoirs filled with the molten zinc alloy material.

Having described my invention, however, many modifications thereto will become apparent to those skilled in the art to which it pertains without deviation from the spirit of the invention as defined by the scope of the appended claims.

We claim:

1. A system for forming metal tubing from a metal strip comprising:

means for rolling said strip into a tube so that longitudinally extending portions of said strip overlay each other, means for heating said tube to a first elevated temperature sufficient to fuse said overlaying portions of said strip together, means for coating said tube with a corrosion resistant material spaced a distance from said means for heating, means for cooling said tube to a second temperature lower than said first temperature between said heating means and said coating means, and means for introducing an inert and/or reducing gas around said tube between said heating means and said coating means, wherein said cooling means comprises a tunnel extending the entire distance between said heating means and said coating means, said tunnel having an interior through which said tube passes, and means for cooling said tunnel, wherein said introducing means comprises means for introducing said inert and/or reducing gas into said interior of said tunnel to prevent oxidation of said tube between said heating means and said coating means.

2. The invention as defined in claim 1 wherein said tunnel cooling means comprises a water jacket surrounding said tunnel and means for pumping water through said water jacket, means for maintaining said water at a third temperature substantially lower than said first temperature.

3. The invention as defined in claim 1 wherein said gas is argon.

4. The invention as defined in claim 1 wherein said gas is a mixture of argon and hydrogen.

5. The invention as defined in claim 1 wherein said gas is a mixture of helium and hydrogen.

6. The invention as defined in claim 1 wherein said gas is helium.

7. The invention as defined in claim 1 wherein said coating means comprises a reservoir of said corrosion resistant material, means for heating said reservoir to a third temperature, and means for guiding said tube through said reservoir.

8. The invention as defined in claim 7 wherein said corrosion resistant material comprises zinc.

9. The invention as defined in claim 7 wherein said third temperature is substantially the same as said second temperature.

10. The invention as defined in claim 1 wherein said coating means comprises a die having an opening, means for passing said tube through said die opening so that a space is formed between said tube and said die opening, and means for feeding said corrosion resistant material into said space.

11. The invention as defined in claim 10 wherein said die includes a chamber coaxial with and surrounding said die opening and a plurality of circumferentially space and radially extending passageways between said chamber and said die opening.

12. The invention as defined in claim 1 and further comprising means for painting an exterior surface of said tube subsequent to said coating means.

13. The invention as defined in claim 1 wherein said second temperature is in range between 850° F. and 1400° F.

14. The invention as defined in claim 1 and comprising idler wheels which contact said tube in said cooling means.

15. The invention as defined in claim 14 and further comprising means for cooling said idler wheels.

* * * * *